US012024758B2

(12) United States Patent
Devaux et al.

(10) Patent No.: US 12,024,758 B2
(45) Date of Patent: Jul. 2, 2024

(54) NICKEL-BASED SUPERALLOY AND PARTS MADE FROM SAID SUPERALLOY

(71) Applicant: AUBERT & DUVAL, Paris (FR)

(72) Inventors: Alexandre Devaux, Combronde (FR); Philippe Heritier, Clermont-Ferrand (FR)

(73) Assignee: AUBERT & DUVAL, Paris (FR)

( * ) Notice: Subject to any disclaimer, the term of this patent is extended or adjusted under 35 U.S.C. 154(b) by 0 days.

(21) Appl. No.: 17/512,439

(22) Filed: Oct. 27, 2021

(65) Prior Publication Data

US 2022/0049326 A1 Feb. 17, 2022

Related U.S. Application Data

(63) Continuation of application No. 16/266,764, filed on Feb. 4, 2019, now Pat. No. 11,193,187, which is a continuation of application No. 13/391,454, filed as application No. PCT/FR2010/051748 on Aug. 20, 2010, now abandoned.

(30) Foreign Application Priority Data

Aug. 20, 2009 (FR) ........................................ 0955714
May 7, 2010 (FR) ........................................ 1053607

(51) Int. Cl.
*C22F 1/10* (2006.01)
*C22C 1/02* (2006.01)
*C22C 19/05* (2006.01)

(52) U.S. Cl.
CPC ............ *C22C 19/056* (2013.01); *C22C 1/023* (2013.01); *C22F 1/10* (2013.01); *F05C 2201/0466* (2013.01)

(58) Field of Classification Search
CPC ................................ C22C 19/056; C22F 1/10
See application file for complete search history.

(56) References Cited

U.S. PATENT DOCUMENTS

| | | | | |
|---|---|---|---|---|
| 3,667,938 | A | 6/1972 | Boesch | |
| 4,083,734 | A | 4/1978 | Boesch | |
| 5,649,280 | A | 7/1997 | Blankenship et al. | |
| 2003/0005981 | A1 | 1/2003 | Ogawa et al. | |
| 2009/0136382 | A1 | 5/2009 | Matsui et al. | |
| 2020/0010930 | A1 * | 1/2020 | Han ...................... | C22C 19/056 |

FOREIGN PATENT DOCUMENTS

| | | | | |
|---|---|---|---|---|
| CN | 1076508 | 9/1993 | | |
| CN | 101421427 | 4/2009 | | |
| EP | 0 361 524 | 4/1990 | | |
| EP | 0 561 179 | 9/1993 | | |
| EP | 0 803 585 | 10/1997 | | |
| EP | 1 065 290 | 1/2001 | | |
| EP | 1340825 A2 * | 9/2003 | ........... | C22C 19/055 |
| JP | 57210942 | 12/1982 | | |
| JP | 2001073053 | 3/2001 | | |
| JP | 2002003970 | 1/2002 | | |
| JP | 2003342617 | 12/2003 | | |
| JP | 2005060826 | 3/2005 | | |
| JP | 2005508193 | 3/2005 | | |
| JP | 2009225756 | 8/2006 | | |
| JP | 2007113057 | 5/2007 | | |
| JP | 2007254804 | 10/2007 | | |
| JP | 2008525634 | 7/2008 | | |
| WO | 9218659 | 10/1992 | | |
| WO | 95/18875 | 7/1995 | | |
| WO | 03/097888 | 11/2003 | | |
| WO | WO-2019021015 A1 * | 1/2019 | ............ | B33Y 70/00 |

* cited by examiner

*Primary Examiner* — Jessee R Roe
(74) *Attorney, Agent, or Firm* — NIXON & VANDERHYE

(57) ABSTRACT

A nickel superalloy has the following composition, the concentrations of the different elements being expressed as wt-%: Formula (I), the remainder consisting of nickel and impurities resulting from the production of the superalloy. In addition, the composition satisfies the following equation, wherein the concentrations of the different elements are expressed as atomic percent: Formula (II).

22 Claims, 1 Drawing Sheet

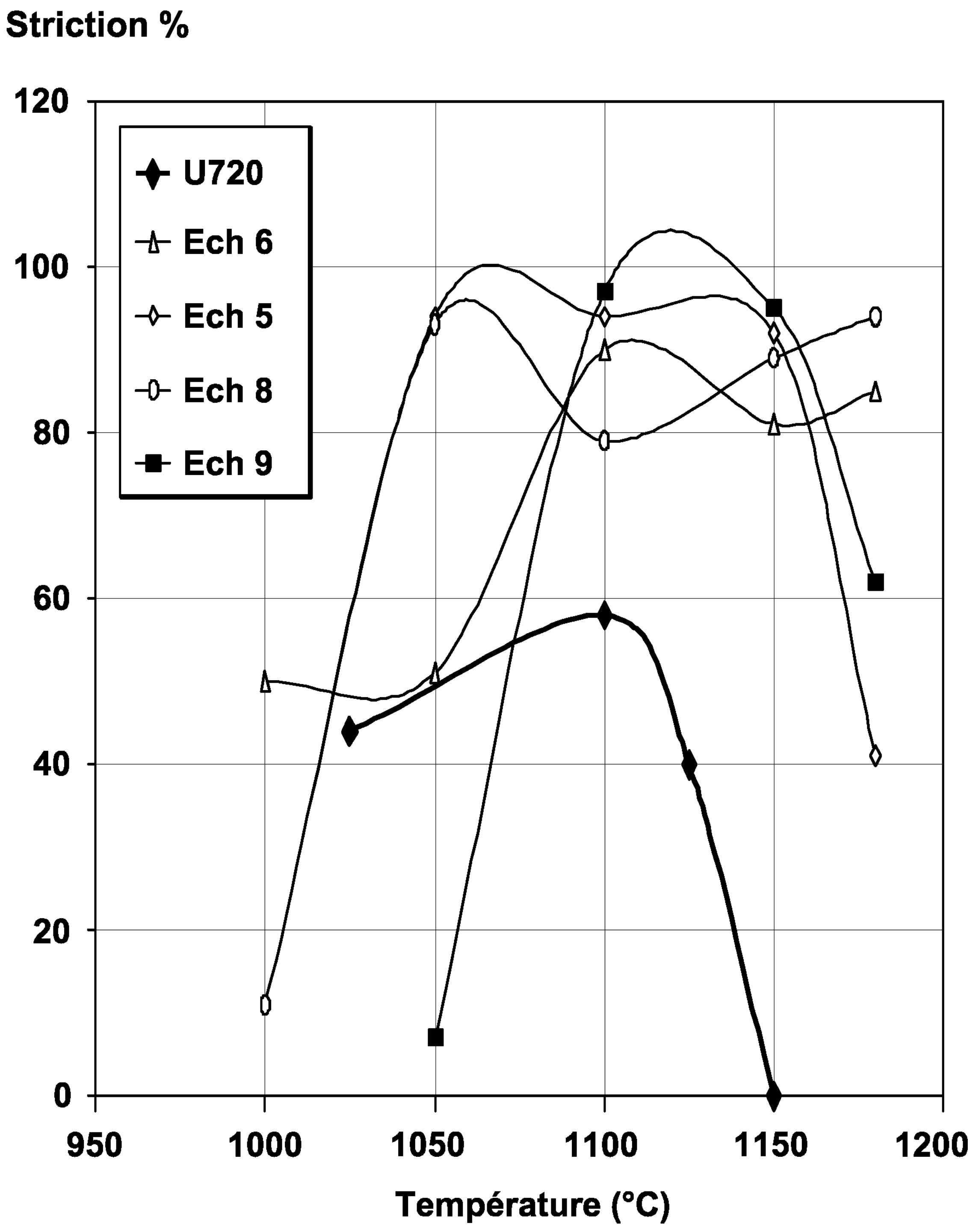
Striction %
120
100
80
60
40
20
0
950
1000
1050
1100
1150
1200
Température (°C)
U720
Ech 6
Ech 5
Ech 8
Ech 9

NICKEL-BASED SUPERALLOY AND PARTS MADE FROM SAID SUPERALLOY

CROSS-REFERENCE TO RELATED APPLICATION

This application is a continuation of U.S. patent application Ser. No. 16/266,764 filed on Feb. 4, 2019, now U.S. Pat. No. 11,193,187, which is a continuation of U.S. patent application Ser. No. 13/391,454 filed on Feb. 21, 2012, now abandoned, which is a national phase of PCT International Application No. PCT/FR2010/051748 filed on Aug. 20, 2010, which claims priority to FR 0955714 filed on Aug. 20, 2009 and FR 1053607 filed on May 7, 2010, the contents of which are hereby incorporated by reference.

BACKGROUND OF THE INVENTION

Field of the Invention

The invention relates to the field of nickel-based superalloys, notably intended for making parts for land or aeronautical turbines, for example discs of turbines.

Description of the Related Art

Improvement in the performances of turbines requires more and more performing alloys at high temperatures. They should notably be capable of supporting operating temperatures of the order of 700° C.

For this purpose, superalloys were developed for guaranteeing high mechanical properties at these temperatures (tensile strength, creep resistance and oxidation resistance, crack propagation strength) for the aforementioned applications, while retaining good microstructural stability providing a long lifetime to the thereby manufactured parts.

Known alloys which may meet these requirements are generally highly loaded with elements promoting the presence of the gamma' phase $Ni_3(Al,Ti)$, the proportion of which is often greater than 45% of the structure. This makes these alloys impossible to apply with satisfactory results via the conventional route (ingot route) where the casting of an ingot from liquid metal is followed by a series of shaping treatments and heat treatments. These alloys can only be obtained with powder metallurgy, with the major drawback of very high cost for obtaining them.

In order to reduce the costs for obtaining them, alloys were developed allowing an application via a conventional route. This is notably the nickel-based superalloy known under the name of UDIMET 720, as notably described in documents U.S. Pat. Nos. 3,667,938 and 4,083,734. This superalloy typically has the composition, described in weight percentages:

trace amounts≤Fe≤0.5%;
12%≤Cr≤20%;
13%≤Co≤19%;
2%≤Mo≤3.5%;
0.5%≤W≤2.5%;
1.3≤Al≤3%;
4.75%≤Ti≤7%;
0.005%≤C≤0.045% for low carbon versions, the carbon content may rise up to 0.15% for high carbon versions;
0.005%≤B≤0.03%;
trace amounts≤Mn≤0.75%;
0.01%≤Zr≤0.08%;

the remainder being nickel and impurities resulting from the production.

The alloy known under the name of TMW 4 was also developed, a possible composition of which in weight percentages is typically:

Cr=15%;
Co=26.2%;
Mo=2.75%;
W=1.25%;
Al=1.9%;
Ti=6%;
C=0.015%;
B=0.015%;

the remainder being nickel and impurities resulting from the production.

With the superalloys of the UDIMET 720 or TMW 4 type it is possible to partly achieve the targeted goals. At high temperatures, they actually retain good mechanical properties because of their high Co contents, and these alloys may be obtained via a conventional route from an ingot, therefore in a less expensive way than with powder metallurgy.

However, they still have a high cost just because of their large Co content which is generally comprised between 12 and 27%. Further, they remain difficult to apply via a conventional ingot route, because of low forgeability notably due to a volume fraction of gamma' phase which remains substantial (about 45%). Indeed, because of the large volume fraction of gamma' phase, the temperature intervals in which forging is possible without any risk of forming cracks, are narrow and impose that they be put back into the oven frequently in order to permanently maintain a suitable temperature during forging. Moreover, for these alloys, forging in gamma' supersolvus (i.e. above the gamma' solvus temperature and therefore at a temperature at which the gamma' phase is put into solution) is impossible, because there would be a risk of occurrence of cracks. These alloys can only be forged in subsolvus (therefore at a temperature below the gamma' solvus), which leads to heterogeneous structures comprising gamma' phase spindles and causing permeability defects during non-destructive tests with ultrasonic waves. For these alloys, the forging process is therefore delicate, difficult to control and costly.

In order to reduce the costs for obtaining them, novel nickel superalloys were developed allowing the aforementioned applications at temperatures of use close to 700° C. An alloy of this type known under the name of «718 PLUS», which is described in document WO-A-03/097888, typically has the following composition in weight percentages:

trace amounts≤Fe≤14%;
12%≤Cr≤20%;
5%≤Co≤12%;
trace amounts≤Mo≤4%;
trace amounts≤W≤6%;
0.6%≤Al≤2.6%;
0.4%≤Ti≤1.4%;
4%≤Nb≤8%;
trace amounts≤C≤0.1%;
0.003%≤P≤0.03%;
0.003%≤B≤0.015%;

the remainder being nickel and impurities resulting from the production.

In order to reduce the costs for obtaining them due to the raw materials (alloy elements) used, relatively to the aforementioned alloys, 718 PLUS has a less substantial Co content. Moreover in order to reduce the costs for obtaining them due to the thermomechanical treatment, the forgeability of this alloy was improved by considerably reducing the volume fraction of the gamma' phase. The lowering of the volume fraction of gamma' phase is however accomplished to the detriment of the hot mechanical properties and of the performances of the parts generally, which, de facto, are clearly lower than those of the alloys mentioned earlier.

In the field of land or aeronautical turbines, the use of the 718 PLUS alloy is therefore limited to certain applications for which the requirements in terms of thermomechanical stresses are less critical.

Moreover, the 718 PLUS alloy has a high Nb content (comprised between 4 and 8%), which is detrimental to its chemical homogeneity during production. Indeed, Nb is an element which leads to substantial segregations at the end of the solidification. These segregations may lead to the formation of production defects (white spots). Only narrow and specific remelting rate windows during the production of the ingot allow reduction of these defects. The production of 718 PLUS therefore involves a method which is complex and difficult to control. High Nb contents in superalloys are also known to be rather detrimental to the propagation of cracks at high temperatures.

BRIEF SUMMARY OF THE INVENTION

The object of the invention is to propose an alloy having a low cost for obtaining it, i.e. with a less substantial cost in alloy elements than that of alloys of the UDIMET 720 type, and for which the forgeability would be increased relatively to alloys of the UDIMET 720 type, and this while having high mechanical properties at high temperatures (700° C.), i.e. higher than those of 718 PLUS. In other words, the aim is to propose an alloy for which the composition would allow a compromise to be obtained between high hot mechanical properties and an acceptable cost for obtaining it for the aforementioned applications. This alloy should also be able to be obtained under not too restrictive production and forging conditions in order to make their obtaining more reliable.

For this purpose, the object of the invention is a nickel-based superalloy of the following composition, the contents of the various elements being expressed as weight percentages:

1.3%≤Al≤2.8%;
trace amounts≤Co≤11%;
14%≤Cr≤17%;
trace amounts≤Fe≤12%;
2%≤Mo≤5%;
0.5%≤Nb+Ta≤2.5%;
2.5%≤Ti≤4.5%;
1%≤W≤4%;
0.0030%≤B≤0.030%;
trace amounts≤C≤0.1%;
0.01%≤Zr≤0.06%;

the remainder consisting of nickel and impurities resulting from the production, and such that the composition satisfies the following equations wherein the contents are expressed as atomic percentages:

8≤Al at %+Ti at %+Nb at %+Ta at %≤11

0.7≤(Ti at %+Nb at %+Ta at %)/Al at %≤1.3

Preferably its composition satisfies the following equation wherein the contents are expressed as atomic percentages:

1≤(Ti at %+Nb at %+Ta at %)/Al at %≤1.3

Preferably, it contains in weight percentages between 3 and 12% of Fe.

Preferably, its composition is expressed in weight percentages:

1.3%≤Al≤2.8%;
7%≤Co≤11%;
14%≤Cr≤17%;
3%≤Fe≤9%;
2%≤Mo≤5%;
0.5%≤Nb+Ta≤2.5%;
2.5%≤Ti≤4.5%;
1%≤W≤4%;
0.0030%≤B≤0.030%;
trace amounts≤C≤0.1%;
0.01%≤Zr≤0.06%;

and its composition satisfies the following equations wherein the contents are expressed as atomic percentages:

8≤Al at %+Ti at %+Nb at %+Ta at %≤11

0.7≤(Ti at %+Nb at %+Ta at %)/Al at %≤1.3 the remainder consisting of nickel and impurities resulting from the production.

Preferably, for this alloy 1≤(Ti at %+Nb at %+Ta at %)/Al at %≤1.3.

Better, the composition of the alloy is expressed in weight percentages:

1.8%≤Al≤2.8%;
7%≤Co≤10%;
14%≤Cr≤17%;
3.6%≤Fe≤7%;
2%≤Mo≤4%;
0.5%≤Nb+Ta≤2%;
2.8%≤Ti≤4.2%;
1.5%≤W≤3.5%;
0.0030%≤B≤0.030%;
trace amounts≤C≤0.07%;
0.01%≤Zr≤0.06%;

and its composition satisfies the following equations wherein the contents are expressed as atomic percentages:

8≤Al at %+Ti at %+Nb at %+Ta at %≤11

0.7≤(Ti at %+Nb at %+Ta at %)/Al at %≤1.3 the remainder consisting of nickel and impurities resulting from the production.

In certain cases for this alloy 0.7≤(Ti at %+Nb at %+Ta at %)/Al at %≤1.15

In certain cases for this alloy 1≤(Ti at %+Nb at %+Ta at %)/Al at %≤1.3.

Preferably, these superalloys comprise a gamma' phase fraction comprised between 30 and 44%, preferably between 32 and 42% and the solvus of the gamma' phase of the superalloy is below 1,145° C.

Preferably, the composition of the alloy satisfies the following equation, wherein the contents of the elements are calculated in the gamma matrix at 700° C. and are expressed as atomic percentages:

0.717 Ni at %+0.858 Fe at %+1.142 Cr at %+0.777 Co at %+1.55 Mo at %+1.655 W at %+1.9 Al at %+2.271 Ti at %+2.117 Nb at %+2.224 Ta at %≤0.901.

Preferably, the Cr content (expressed as an atomic percentage) is in the gamma matrix at 700° C., greater than 24 at %.

Preferably, the Mo+W content (expressed as an atomic percentage) is ≥2.8 at % in the gamma matrix.

The object of the invention is also a part in a nickel superalloy, characterized in that its composition is of the previous type.

This may be a component of an aeronautical or land turbine.

As this will have been understood, the invention is based on an accurate equilibration of the composition of the alloy in order to obtain both mechanical properties, ease in forging and preferably a material cost of the alloy as moderate as possible, making the alloy suitable for economical production via the standard ingot route of parts which may operate under high mechanical and thermal stresses, notably in land and aeronautical turbines.

BRIEF DESCRIPTION OF THE DRAWING

The FIGURE is a graph illustrating curves of respective forgeabilities measured on remelted and homogenized ingots at temperatures from 1,000 to 1,180° C. of alloys according to the present invention.

DETAILED DESCRIPTION OF THE PREFERRED EMBODIMENTS

The invention will now be described with reference to the appended the FIGURE which shows the respective forgeabilities (represented by striction) measured on remelted and homogenized ingots at temperatures from 1,000 to 1,180° C., of alloys according to the invention and of a reference alloy of the UDIMET 720 type, the substitution of which is aimed by the invention.

While providing good mechanical properties, the alloy according to the invention has good forgeabilities by limited contents of elements generating the gamma' phase, and notably of Nb, in order to also avoid segregation problems during the production. An alloy according to the invention is for example forgeable in the domain of the supersolvus of the alloy by which it is possible to ensure better homogeneity of the metal and to significantly reduce the costs related to the forging process.

As this may be seen, a superalloy according to the invention in addition to reducing the costs associated with the raw materials, allows reduction of the costs relating to the production processes and to the thermo-mechanical treatment processes (forging and closed die-forging) of a part made in this superalloy.

The alloys obtained according to this invention are globally obtained at a relatively low cost, in any case at a lower cost than those of the alloys of the UDIMET 720 type, and this while having a high mechanical properties at high temperatures i.e. greater than those of alloys of the 718 PLUS type.

By lowering the Co content to below 11% it is possible to considerably reduce the cost of the alloy, Co being the most expensive among the alloy elements massively present in the invention. In order to maintain good mechanical properties during creep and traction, lowering the Co content is on the one hand compensated by adjusting Ti, Nb and Al contents forming the gamma' hardening phase and, on the other hand, compensated by an adjustment of the W and Mo contents which will harden the gamma matrix of the alloy.

The inventors were able to notice that by adding Fe as a partial substitution for the Co content (relatively to alloys of the UDIMET 720 or TMW-4 type) it was also possible to significantly reduce the cost of the alloy.

The inventors were able to notice that an optimum Co content was comprised between 7 and 11%, better 7 to 10%, in order to reach a significant increase in the mechanical properties such as creep resistance while maintaining a low cost in raw materials, preferably by adding 3 to 9% of Fe, better 3.6 to 7%, into the composition. Beyond 11% Co, the inventors were able to notice that the performances of the alloy were not significantly improved.

An alloy according to this composition gives the possibility of reaching mechanical properties close to those of the most performing alloys such as the aforementioned ones (UDIMET 720 and TMW-4) while keeping a low cost for obtaining them since, for example, it is possible to easily reach a cost of raw materials of less than 24 €/kg (a cost close to that of 718 PLUS, see the examples hereafter). In order to determine the costs of the raw materials making up the liquid metal from which the ingot will be cast and forged, for each element the following costs per kg are considered:

Ni: 20 €/kg,
Fe: 1 €/kg
Cr: 14 €/kg,
Co: 70 €/kg,
Mo: 55 €/kg,
W: 30 €/kg,
Al: 4 €/kg,
Ti: 11 €/kg,
Nb: 50 €/kg,
Ta: 130 €/kg

Of course, these figures may strongly vary over time and the equation (1) which will be shown, by which it is determined what would represent an optimization of the composition of the alloy in terms of costs of raw materials, only has an indicative value and does not form a parameter which should be strictly observed so that the alloy is compliant with the invention.

The targeted ratio of the sum of the Ti, Nb and Ta contents and of the Al content gives the possibility of ensuring hardening via a solid solution of the gamma' phase while avoiding the risk of occurrence of a needled phase in the alloy which may alter its ductility.

A minimum gamma' phase fraction (preferably 30%, better 32%) is desired in order to obtain a very good strength during creep and traction at 700° C. The fraction and the solvus of the gamma' phase should however be preferably less than 44% (better 42%) and at 1,145° C. respectively so that the alloy retains good forgeability, and also so that the alloy may be partly forged in the supersolvus domain, i.e. at a temperature comprised between the gamma' solvus and the melting onset temperature.

The proportions of the phases present in the alloy, such as the volume fractions of gamma' phases and the molar concentrations of the TCP phases (the definition of which will be given later on), were determined by the inventors and according to the composition, by resorting to phase diagrams obtained by thermodynamic calculations (by means of the THERMOCALC software package currently used by metallurgists).

The parameter Md, which is usually used as an indicator of the stability of superalloys, should be less than 0.901 in order to impart optimum stability to the alloy according to the invention. Within the scope of the invention, the composition may therefore be adjusted so as to reach an Md≤0.901 without being detrimental to the other mechanical properties of the alloy. Beyond 0.901, the alloy risks being unstable, i.e. giving rise during extended use to the precipitation of detrimental phases, such as the sigma and mu phases which embrittle the alloy.

The aforementioned conditions on the Mo+W content in the gamma matrix are justified in order to avoid precipitation of brittle intermetallic compounds of the sigma or mu type.

The sigma and mu phases, when they develop in an excessive amount, cause a significant reduction in the ductility and in the mechanical strength of the alloys.

It was also observed that excessive Mo and W contents strongly alter the forgeability of the alloy and considerably reduce the forgeability domain, i.e. the temperature domain where the alloy tolerates large deformations for hot shaping.

These elements further have high atomic masses and their presence is expressed by a notable increase in the specific gravity of the alloy which for aeronautical applications is a predominant criterion.

The composition according to the invention gives the possibility of maintaining a TCP (Topologically Close-Packed=topologically compact phases such as the mu+sigma phases, the content of which is expressed as a phase molar percentage) content of less than 6% at 700° C. in the alloy. This value allows confirmation that the superalloy according to the invention has very good microstructural stability at high temperatures.

The mandatorily or optimally observed equations by the composition of the alloy according to the invention are:

(1) (optimally) cost (€/kg)<25 with cost=20 Ni %+Fe %+14 Cr %+70 Co %+55 Mo %+30 W %+4 Al %+11 Ti %+50 Nb %+130 Ta % in weight percentages, with the reservations expressed above on the strict validity of this criterion, due to inevitable variations in the price of the alloy elements.

(2) (optimally) Md=0.717 Ni at %+0.858 Fe at %+1.142 Cr at %+0.777 Co at %+1.55 Mo at %+1.655 W at %+1.9 Al at %+2.271 Ti at %+2.117 Nb at %+2.224 Ta at % 0.901, the contents (at %) of the various elements being calculated in the gamma matrix at 700° C. (an equation resulting from thermodynamic calculations made with models customarily known to metallurgists working in the field of nickel-based superalloys).

(3) (optimally) Cr≥24 at % in the gamma matrix at 700° C. for optimizing the oxidation resistance (optimization resulting from thermodynamic calculations).

(4) (mandatorily) 0.7≤(Ti at %+Nb at %+Ta at %)/Al at %≤1.3 for ensuring hardening of the γ' and limiting the risk of occurrence of a needled phase, and optimally 1≤(% Ti+% Nb+% Ta)/% Al≤1.3 for better hardening, and optimally 0.7≤(Ti at %+Nb at %+Ta at %)/Al at %≤1.15 in order to avoid the risk of occurrence of a needled phase.

(5) (mandatorily) 8<Al at %+Ti at %+Nb at %+Ta at %<11 for ensuring an adequate fraction of gamma' phase.

(6) (optimally) 30%<γ' fraction <45% and γ' solvus<1,145° C. (optimization resulting from thermodynamic calculations): better: 32%<γ' fraction<42%; it is in this interval where the best compromise is obtained between creep strength and tensile strength on the one hand and forgeability on the other hand; the optimum value is about 37%.

(7) (optimally) molar percent of TCP phases≤6% at 700° C. in order to ensure good microstructural stability at high temperatures (optimization resulting from thermodynamic calculations).

(8) (optimally) Mo at %+ W at % in the gamma phase at 700° C.≥2.8 in order to ensure proper hardening of the gamma matrix (optimization resulting from thermodynamic calculations), but without exceeding Mo weight contents of 5% and W weight contents of 4% in order to avoid precipitation of brittle intermetallic compounds of the sigma or mu type.

The selections of the contents according to the invention will now be motivated in detail, element by element.

Cobalt

The cobalt content was limited to contents of less than 11%, better less than 10%, for economical reasons, insofar that this element is one of the most expensive of those entering the composition of the alloy (see equation (1) where this element has the second strongest weighting after Ta). Advantageously, a minimum content of 7% is desired in order to retain very good creep strength.

Iron

Substitution of the nickel or cobalt with iron has the advantage of significantly reducing the cost of the alloy. Addition of iron however promotes precipitation of the sigma phase harmful for ductility and notch sensitivity. The iron content of the alloy should therefore be adjusted so as to obtain a significant cost reduction while guaranteeing a highly stable alloy at a high temperature (equations (2), (7)). The iron content in the general case is comprised between trace amounts and 12%, but is preferably comprised between 3 and 12%, better between 3 and 9%, better between 3.6 and 7%.

Aluminum, Titanium, Niobium, Tantalum

The weight contents of these elements are from 1.3 to 2.8%, better 1.8 to 2.8% for Al, 2.5 to 4.5%, better 2.8 to 4.2% for Ti, 0.5 to 2.5%, better 0.5 to 2% for the sum Ta+Nb.

Although the precipitation of the gamma' phase in the nickel-based alloys is essentially a matter of the presence of aluminum in a sufficient concentration, the elements, Ti, Nb and Ta, may promote the occurrence of this phase if they are present in the alloy with a sufficient concentration: the elements aluminum, titanium, niobium and tantalum are elements said to be «gamma'-genes». The stability domain of the gamma' phase (the gamma' solvus of which the alloy is representative) and the gamma' phase fraction therefore depend on the sum of the atomic concentrations (at %) of aluminum, titanium, niobium and tantalum. These elements have thus been adjusted so as to obtain optimally, a γ' phase fraction comprised between 30% and 44%, better between 32% and 42%, and a gamma' phase solvus of less than 1,145° C. An adequate gamma' phase fraction in the alloys of the invention is obtained with a sum of the Al, Ti, Nb and Ta contents greater than or equal to 8 at % and less than or equal to 11 at %. A minimum gamma' phase fraction is desired in order to obtain very good creep and tensile strength at 700° C. The fraction and the solvus of the gamma' phase should however preferably be less than 40% and 1,145° C. respectively so that the alloy retains good forgeability, and may also be partly forged in the supersolvus domain, i.e. at a temperature comprised between the gamma' solvus and the melting onset temperature. A γ' phase fraction and a solvus temperature exceeding the upper limits mentioned earlier would make the application of the alloy more difficult via the conventional ingot route, which would risk attenuating one of the advantages of the invention.

According to a remarkably advantageous aspect of the invention, the aluminum, titanium, niobium and tantalum contents are such that the ratio between the sum of the titanium, niobium and tantalum contents and the aluminum content is greater than or equal to 0.7 and less than or equal to 1.3. Indeed, hardening in a solid solution in the gamma' phase provided by Ti, Nb and Ta is all the higher since the ratio (Ti at %+Nb at %+Ta at %)/Al at % is high. A ratio greater than or equal to 1 will be preferred for guaranteeing better hardening. However for a same aluminum content, too high Ti, Nb or Ta contents promote precipitation of needled phases of the eta type ($Ni_3Ti$) or delta type ($Ni_3(Nb,Ta)$) but which are not desired within the scope of the invention: these phases if they are present in too large amounts may alter the hot ductility of the alloy by precipitating as needles at the grain boundaries. The ratio (Ti at %+Nb at %+Ta at %)/Al at % should therefore not exceed 1.3 and preferably 1.15 in order to prevent precipitation of these detrimental phases. The Nb and Ta contents on the other hand are less than the titanium content so that the density of the alloy remains acceptable (less than 8.35), in particular for aeronautical applications. It is also known to one skilled in the art that too high niobium contents are detrimental to resistance to hot crack propagation (650-700° C.). The niobium is preferably present in a larger proportion than tantalum insofar that tantalum has a higher cost and a higher atomic mass than niobium. Equations (1), (4) and (5) take these conditions into account.

Molybdenum and Tungsten

The Mo content should be comprised between 2 and 5% and the W content between 1 and 4%. Optimally, the MO content is comprised between 2 and 4% and the W content comprised between 1.5 and 3.5%.

Molybdenum and tungsten provide strong hardening of the gamma matrix by a solid solution effect. The Mo and W contents should be adjusted with care in order to obtain optimum hardening without causing precipitation of brittle intermetallic compounds of the sigma or mu type. These phases, when they develop in an excessive amount, cause a substantial reduction in the ductility and the mechanical strength of the alloys. It was also observed that excessive Mo and W contents strongly alter the forgeability of the alloy and considerably reduce the forgeability domain, i.e. the temperature domain where the alloy tolerates substantial deformations for hot shaping. These elements further have high atomic masses, and their presence is expressed by a notable increase in the specific gravity of the alloy, which is not desirable for aeronautical applications notably. Equations (2), (7) and (8) take these conditions into account.

Chromium

Chromium is indispensable for resistance to oxidation and corrosion of the alloy and thus plays an essential role for the resistance of the alloy to environmental effects at high temperature. The chromium content (14 to 17% by weight) of the alloys of the invention was determined so as to introduce a minimum concentration of 24 at % of Cr in the gamma phase at 700° C., by taking into account the fact that a too high chromium content promotes precipitation of detrimental phases such as the sigma phase and therefore deteriorates hot stability. Equations (2), (3) and (7) take these conditions into account.

Boron, Zirconium, Carbon

The B content is comprised between 0.0030 and 0.030%. The Zr content is comprised between 0.01 and 0.06%. The C content is comprised between trace amounts and 0.1%, optimally between trace amounts and 0.07%.

So-called minor elements such as carbon, boron and zirconium form segregations at the grain boundaries, for example as borides or carbides. They contribute to increasing the strength and the ductility of the alloys by trapping detrimental elements such as sulfur and by modifying the chemical composition at the grain boundaries. Their absence would be detrimental. However, excessive contents cause reduction in the melting temperature and strongly alter forgeability. They therefore have to be maintained within the limits which have been stated.

Examples, tested in the laboratory, for applying the invention will now be described and compared with reference examples. The contents of Table 1 are indicated in weight percentages. None of these examples contains tantalum in notable proportions, but this element has a comparable behavior with that of niobium, as this was stated.

TABLE 1 compositions of the samples tested in the laboratory

| | example | Al | Co | Cr | Fe | Mo | Nb | Ni | Ti | W | B | C | Zr | P |
|---|---|---|---|---|---|---|---|---|---|---|---|---|---|---|
| Ref | 1 | 1.4 | 9.0 | 18.0 | 10.2 | 2.8 | 5.6 | remainder | 0.7 | 1.0 | 0.0052 | 0.002 | — | 0.009 |
| Ref | 2 | 1.7 | 9.0 | 15.5 | 5.0 | 3.0 | 1.4 | remainder | 3.9 | 2.5 | 0.0110 | 0.002 | 0.03 | — |
| Inv | 3 | 2.2 | 9.0 | 15.5 | 5.1 | 3.0 | 1.3 | remainder | 3.9 | 2.5 | 0.0110 | 0.003 | 0.03 | — |
| Ref | 4 | 2.1 | 9.0 | 15.5 | 5.1 | 3.0 | 3.4 | remainder | 2.4 | 2.5 | 0.0100 | 0.004 | 0.03 | — |
| Inv | 5 | 2.1 | 11.0 | 15.0 | 11.0 | 2.5 | 1.0 | remainder | 3.6 | 1.5 | 0.0100 | 0.040 | 0.03 | — |
| Inv | 6 | 2.1 | 9.0 | 15.5 | 5.1 | 3.0 | 1.0 | remainder | 3.6 | 2.5 | 0.0110 | 0.005 | 0.03 | — |
| Inv | 7 | 2.1 | 6.1 | 15.5 | 3.1 | 3.4 | 1.0 | remainder | 3.6 | 3.0 | 0.0120 | 0.011 | 0.03 | — |
| Inv | 8 | 1.8 | 2.1 | 16.0 | 9.2 | 2.8 | 1.0 | remainder | 3.3 | 2.5 | 0.0110 | 0.006 | 0.03 | — |
| Inv | 9 | 2.3 | 9.1 | 15.0 | 3.1 | 3.1 | 1.2 | remainder | 4.0 | 2.2 | 0.0110 | 0.007 | 0.03 | — |
| Inv | 10 | 2.4 | 8 | 15.3 | 4 | 3 | 0.7 | remainder | 3.3 | 3 | 0.0120 | 0.01 | 0.04 | — |

Examples 1 to 4 were elaborated by VIM (vacuum induction melting) in order to produce 10 kg ingots.

Examples 5 to 10 were elaborated by VIM and then by VAR (vacuum arc remelting) in order to produce 200 kg ingots.

Reference Example 1 corresponds to a conventional 718 PLUS alloy.

Reference Example 2 is then outside the invention because of a ratio (Ti at %+Nb at %)/Al at %=1.5, therefore greater than 1.3.

Reference Example 4 is outside the invention because of a too high Nb content which theoretically corresponds to the Nb content beyond which the delta phase may occur.

Examples 5, 7, 8 and 9 correspond to the invention, although to non-optimized alternatives thereof.

Examples 3, 6 and 10 correspond to the preferred version of the invention.

The optimum composition was obtained for Example 6. By comparison with this Example 6:

- Example 5 contains more Fe, Co and C and less Mo and W;
- Example 7 contains less Fe and Co and more Mo and W;
- Example 8 is less loaded with alloy elements such as Al, Co, Mo, Ti and more loaded with Fe;
- Example 9 is more loaded with alloy elements such as Al, Ti, Nb and less loaded with Fe and W;
- Example 10 has a lower ratio (Ti at %+Nb at %)/Al at % and includes more W, less Co and less Fe;
- Reference Example 2 contains more Ti and Nb and less Al, for an equal fraction of gamma' phase; the ratio (Ti at %+Nb at %)/Al at % is higher.

Example 3 contains more Al and Nb and Ti, therefore a higher fraction of gamma' phase;

Example 4, for an equal fraction of gamma' phase, contains more Nb and less Ti.

Table 2 shows additional characteristics of the tested alloys, with their main mechanical properties: tensile strength Rm, yield strength $Rp_{0.2}$, elongation at break A, creep lifetime at 700° C. under a stress of 600 MPa. The mechanical properties are given in values relative to those of Reference Example 1 which is of the usual 718 PLUS type.

TABLE 2 complementary characteristics and mechanical properties of the samples

| | Example | Gamma' fraction (%) | Gamma' solvus (° C.) | (Ti + Nb + Ta)/Al | Md | Cost (€/kg) | (Rationalized with respect to 718 PLUS) Rm 700° C. | $Rp_{0.2}$ 700° C. | A % 700° C. | Creep lifetime 700° C. 600 MPa |
|---|---|---|---|---|---|---|---|---|---|---|
| Ref | 1 | 26 | 950 | 1.35 | 0.904 | 23.9 | 1.0 | 1.0 | 1.0 | 1.0 |
| Ref | 2 | 36 | 1100 | 1.5 | 0.892 | 23.6 | 1.3 | 1.3 | 0.8 | 1.8 |
| Inv | 3 | 40 | 1115 | 1.17 | 0.895 | 23.7 | 1.3 | 1.3 | 1.2 | 8 |
| Ref | 4 | 37 | 1070 | 1.13 | 0.899 | 24.4 | 1.1 | 1.2 | 0.6 | 0.1 |
| Inv | 5 | 37 | 1095 | 1.1 | 0.896 | 23.7 | 1.2 | 1.15 | 1.3 | 3.5 |
| Inv | 6 | 37 | 1095 | 1.1 | 0.894 | 23.6 | 1.3 | 1.2 | 1.4 | 5.3 |
| Inv | 7 | 37 | 1105 | 1.1 | 0.895 | 22.6 | 1.2 | 1.2 | 1.5 | 3 |
| Inv | 8 | 32 | 1070 | 1.2 | 0.891 | 19.2 | 1.2 | 1.1 | 1.5 | 1.1 |
| Inv | 9 | 42 | 1125 | 1.15 | 0.895 | 23.9 | 1.2 | 1.3 | 1.1 | 8.3 |
| Inv | 10 | 40 | 1095 | 0.85 | 0.895 | 23.2 | 1.15 | 1.1 | 1.5 | 6.2 |

The tensile strength and the creep lifetime of the alloys of the invention are all clearly greater than that of the 718 PLUS alloy (Example 1), while the cost of the alloy is comparable or lower. The gain in tensile strength, in yield strength and in resistance to creep is less than for Example 8, but the cost of this alloy is much less than that of 718 PLUS. Examples 2 and 4, which are not part of the invention, show a reduction in the hot ductility relatively to the one obtained with 718 PLUS, which is expressed by a lesser elongation at break.

The mechanical properties of the alloys of the invention are thus much superior to those of 718 PLUS and close to those of UDIMET 720.

The alloys of the invention have a cost of raw materials which is less than or equal to 718 PLUS, and therefore they are much less expensive than UDIMET 720, for which the cost of raw materials, calculated according to the same criteria, would amount to 26.6 ekg.

Another advantage of the alloys of the invention with respect to UDIMET 720 is unquestionably better forgeability which facilitates application of the alloys and reduces the manufacturing costs. Indeed, t shows that the alloys of the invention have a better striction coefficient and therefore excellent forgeability in the stage of an ingot homogenized between 1,100 and 1,180° C., and that these alloys unlike UDIMET 720 tolerate forging at a temperature above the solvus of the gamma' phase. With this, it is possible to obtain less complex transformation ranges and more homogeneous microstructures: the refining of the grain may be carried out during the first transformation stages in the absence of gamma' phase.

The invention claimed is:

1. A process for the preparation of a part comprising manufacturing a part from a nickel-based superalloy of the following composition, the contents of the various elements being expressed as weight percentages:

1.3%≤Al≤2.8%;

trace amounts≤Co≤11%;

14%≤Cr≤17%;

trace amounts≤Fe≤12%;

2%≤Mo≤5%;

0.5%≤Nb+Ta≤2.5%;

2.5%≤Ti≤4.5%;

1%≤W≤4%;

0.0030%≤B≤0.030%;

trace amounts≤C≤0.1%;

0.01%≤Zr≤0.06%;

the remainder consisting of nickel and impurities resulting from the production, and such that the composition satisfies the following equations wherein the contents are expressed as atomic percentages:

$$8 \leq \text{Al at \%} + \text{Ti at \%} + \text{Nb at \%} + \text{Ta at \%} \leq 11$$

$$0.7 \leq (\text{Ti at \%} + \text{Nb at \%} + \text{Ta at \%}) / \text{Al \% at \%} \leq 1.3,$$

wherein the superalloy comprises a gamma' phase fraction comprised between 30 and 44%, and the solvus of the gamma' phase of the superalloy is less than 1,145° C.

2. The process according to claim 1, wherein the composition of the nickel-based superalloy satisfies the following equation wherein the contents are expressed as atomic percentages:

$$1 \leq (\text{Ti at \%} + \text{Nb at \%} + \text{Ta at \%}) / \text{Al at \%} \leq 1.3$$

3. The process according to claim 1, wherein the nickel-based superalloy contains between 3.6 and 120 of Fe, as weight percentages.

4. The process according to claim 1, wherein the composition of the nickel-based superalloy is, expressed as weight percentages:

1.3%≤Al≤2.80;

7%≤Co≤11%;

14%≤Cr≤17%;

3.6%≤Fe≤9%;

2%≤Mo≤5%;

0.5%≤Nb+Ta≤2.5%;

2.5%≤Ti≤4.5%;

1%≤W≤4%;

0.0030%≤B≤0.030%;

trace amounts≤C≤0.1%;

0.01%≤Zr≤0.06%;

and said composition satisfies the following equations wherein the contents are expressed as atomic percentages:

$$8 \leq \text{Al at \%} + \text{Ti at \%} + \text{Nb at \%} + \text{Ta at \%} \leq 11$$

$$0.7 \leq (\text{Ti at \%} + \text{Nb at \%} + \text{Ta at \%}) / \text{Al at \%} \leq 1.3$$

the remainder consisting of nickel and of impurities resulting from the production.

5. The process according to claim 4, wherein the composition of the nickel-based superalloy satisfies the following equation wherein the contents are expressed as atomic percentages:

$$1 \leq (\text{Ti at \%} + \text{Nb at \%} + \text{Ta at \%}) / \text{Al at \%} \leq 1.3.$$

6. The process according to claim 4, wherein the composition of the nickel-based superalloy is, expressed as weight percentages:

1.8%≤Al≤2.8%;

7%≤Co≤10%;

14%≤Cr≤17%;

3.6%≤Fe≤7%;

2%≤Mo≤4%;

0.5%≤Nb+Ta≤2%;

2.8%≤Ti≤4.2%;

1.5%≤W≤3.5%;

0.0030%≤B≤0.030%;

trace amounts≤C≤0.07%;

0.01%≤Zr≤0.06%;

and said composition satisfies the following equations wherein the contents are expressed as atomic percentages:

$$8 \leq \text{Al at \%} + \text{Ti at \%} + \text{Nb at \%} + \text{Ta at \%} \leq 11$$

$$0.7 \leq (\text{Ti at \%} + \text{Nb at \%} + \text{Ta at \%}) / \text{Al at \%} \leq 1.3$$

the remainder consisting of nickel and of impurities resulting from the production.

7. The process according to claim 6, wherein the composition of the nickel-based superalloy satisfies the following equation wherein the contents are expressed as atomic percentages:

$$0.7 \leq (\text{Ti at \%} + \text{Nb at \%} + \text{Ta at \%}) / \text{Al at \%} \leq 1.15.$$

8. The process according to claim 6, wherein the composition of the nickel-based superalloy satisfies the following equation wherein the contents are expressed as atomic percentages:

$$1 \leq (\text{Ti at \%} + \text{Nb at \%} + \text{Ta at \%}) / \text{Al at \%} \leq 1.3.$$

9. The process according to claim 1, wherein the Cr content (expressed as an atomic percentage) of the nickel-based superalloy is, in the gamma matrix at 700° C., greater than 24 at %.

10. The process according to claim 1, wherein the Mo+W content (expressed as an atomic percentage) of the nickel-based superalloy is ≥2.8 at % in the gamma matrix.

11. The process according to claim 1, wherein the manufacturing of the part comprises vacuum induction melting of the nickel-based superalloy.

12. The process according to claim 11, wherein the manufacturing of the part further comprises remelting the nickel-based superalloy after vacuum induction melting.

13. The process according to claim 12, wherein the remelting comprises vacuum arc remelting.

14. The process according to claim 1, wherein the manufacturing of the part is implemented by forging the nickel-based superalloy.

15. The process according to claim 14, wherein forging is at least partly implemented at a temperature above the gamma' solvus temperature of the alloy.

16. The process according to claim 14, wherein forging is at least partly implemented at a temperature above 1,100° C.

17. The process according to claim 15, wherein forging is at least partly implemented at a temperature between the gamma' solvus temperature of the alloy and the melting onset temperature.

18. The process according to claim 1, comprising providing an ingot of said nickel-based superalloy and hot shaping said ingot.

19. The process according to claim 18, comprising remelting and homogenizing the ingot at temperatures higher than 1,000° C. before hot shaping.

20. The process according to claim 1, wherein the prepared part is a component of an aeronautical or land gas turbine.

21. The process according to claim 1, wherein the manufacturing of the part is implemented by powder metallurgy.

22. The process according to claim 1, wherein the superalloy comprises a gamma' phase fraction comprised between 32 and 42%, and the solvus of the gamma' phase of the superalloy is less than 1,145° C.

* * * * *